(12) United States Patent
Gruber

(10) Patent No.: US 7,684,221 B2
(45) Date of Patent: Mar. 23, 2010

(54) METHOD AND CIRCUIT FOR GALVANICALLY ISOLATED TRANSMISSION OF A SIGNAL

(75) Inventor: Paul Gruber, Paderborn (DE)

(73) Assignee: Dspace Digital Signal Processing and Control Engineering GmbH, Paderborn (DE)

( * ) Notice: Subject to any disclaimer, the term of this patent is extended or adjusted under 35 U.S.C. 154(b) by 290 days.

(21) Appl. No.: 11/328,616

(22) Filed: Jan. 10, 2006

(65) Prior Publication Data

US 2006/0152082 A1 Jul. 13, 2006

(30) Foreign Application Priority Data

Jan. 11, 2005 (DE) .................. 10 2005 001 322

(51) Int. Cl.
*H04B 14/02* (2006.01)
(52) U.S. Cl. .................. 363/126; 327/109; 375/258
(58) Field of Classification Search .......... 363/127, 363/125, 126; 327/109, 35, 37; 375/258; 307/110
See application file for complete search history.

(56) References Cited

U.S. PATENT DOCUMENTS

| | | | | | |
|---|---|---|---|---|---|
| 4,058,738 | A | * | 11/1977 | Udvardi-Lakos | ............. 307/66 |
| 4,767,952 | A | * | 8/1988 | Nollet | .......................... 327/410 |
| 4,819,145 | A | * | 4/1989 | Maeba | .......................... 363/63 |
| 4,970,420 | A | * | 11/1990 | Billings | ....................... 327/430 |
| 5,387,848 | A | | 2/1995 | Wong | |
| 5,615,229 | A | | 3/1997 | Sharma et al. | ............... 375/259 |
| 6,012,736 | A | | 1/2000 | Hansen et al. | |
| 6,091,779 | A | | 7/2000 | Griessbach | .................. 375/258 |
| 6,124,759 | A | * | 9/2000 | Migliavacca | ................. 330/253 |
| 6,362,463 | B1 | * | 3/2002 | Bessyo et al. | ............... 219/715 |
| 6,479,970 | B2 | * | 11/2002 | Reddy | ......................... 320/162 |
| 6,483,731 | B1 | * | 11/2002 | Isurin et al. | .................. 363/125 |
| 6,545,888 | B2 | * | 4/2003 | Peek et al. | ................... 363/125 |
| 6,970,023 | B2 | * | 11/2005 | Fedigan | ....................... 327/109 |
| 2002/0105233 | A1 | * | 8/2002 | Vice | ........................... 307/105 |
| 2004/0232971 | A1 | * | 11/2004 | Kawasaki et al. | ............ 327/427 |

FOREIGN PATENT DOCUMENTS

| | | |
|---|---|---|
| DE | 39 22 556 | 1/1991 |
| DE | 196 53 522 | 6/1998 |
| DE | 197 36 346 | 1/1999 |
| DE | 10057315 A1 * | 5/2002 |
| EP | 0 706 732 | 4/1996 |

OTHER PUBLICATIONS

German Search Report, Application Serial No. DE 10 2005 001 322.8, German Patent and Trademark Office, Aug. 18, 2005 (brief English translation submitted herewith).
"Half-Duplex iCoupler Isolated RS-485 Transceiver", Analog Devices, ADM2483, pp. 1-20, Rev. 0.

* cited by examiner

*Primary Examiner*—Harry Behm
(74) *Attorney, Agent, or Firm*—Darby & Darby

(57) ABSTRACT

A method for galvanically isolated transmission of a signal, especially a switching signal for controlling at least one switching means includes using a transformer. The primary side of a transformer is fed with a pulse-width modulated voltage in which different duty factors are indicative of different signal states. The voltage obtained on the secondary side is converted by an electronic circuit into at least one signal voltage which is dependent on the duty factor and whose magnitude represents a signal state.

15 Claims, 5 Drawing Sheets

| Component | Value / Type | Manufacturer | Comments |
|---|---|---|---|
| C1 | 22nF 10% X7R 50V | any | |
| C2, C3 | 2,2nF 10% X7R 50V | any | |
| C4 | 100nF 10% X7R 50V | any | |
| D1, D2 | BAT54SW | several, e.g., ON Semiconductor | double diode (2-in-1 package) |
| IC1, IC2 | TS862ID | ST Microelectronics | double comparator (2-in-1 package) |
| IC3 | SN74AHCT16373DGGR | Texas Instruments | 16 bin latch, only 1 output plotted, FPGA-controlled |
| L1/L2 | 00 6071 00 | Neosid | turns ratio 1:1.7 (1 on the left : 1.7 on the right in the circuit diagram) |
| R1, R2 | 22 kOhm 5% | any | |
| T1, T2 | Si3430DV | Vishay Siliconix | |
| T3 | 2SJ508 | Toshiba | |

Fig. 5

METHOD AND CIRCUIT FOR GALVANICALLY ISOLATED TRANSMISSION OF A SIGNAL

Priority is claimed to German patent application DE 10 2005 001 322.8, the entire subject matter of which is hereby incorporated by reference herein.

The present invention relates to a method for galvanically isolated transmission of a signal, especially a switching signal for controlling at least one switching means, the galvanic isolation being achieved using a transformer. The present invention further relates to a circuit comprising a transformer for galvanically isolating signals.

BACKGROUND

In the prior art, it is known, for example, to use transformers for galvanically isolated transmission of a signal, and thus, for potential-free transmission, in which case the transformers are often also referred to as signal transformers. Signal transmission via such a transformer is accomplished through induction in the transformer coils involved.

It is also known that galvanically isolated signal transmission can also be accomplished using so-called optocouplers, in which a signal is optically transmitted between involved components of an optocoupler.

Especially the latter option, which uses optocouplers, turns out to be expensive and has a large power loss, especially at high switching speeds.

SUMMARY OF THE INVENTION

An object of the present invention is to provide a method and circuit which allows galvanically isolated, potential-free transmission of signals via a transformer, while providing a simple design, achieving low power losses and a cost-effective implementation, and especially without requiring much space.

The present invention provides a method for galvanically isolated transmission of a signal, especially a switching signal for controlling at least one switching means, the galvanic isolation being achieved using a transformer. The method includes feeding a primary side of a transformer with a pulse-width modulated voltage in which different duty factors are indicative of different signal states; the voltage obtained on the secondary side being converted by an electronic circuit into at least one signal voltage which is dependent on the duty factor and whose magnitude represents a signal state.

Using this method, a particularly cost-effective design can be achieved, because simple and inexpensive electronic components may be used here. Thus, this method simply uses a pulse-width modulated voltage in which, for example, in one advantageous embodiment, the voltage level of each pulse, and preferably also the frequency of the pulse-width modulated voltage, are always constant; the signal to be transmitted then being able to be encoded in different duty factors, and thus ultimately in different time widths of the ON voltage pulses. Thus, for example, a duty factor at which an ON voltage pulse takes one third of the total cycle time may represent a first signal state, and a duty factor at which an ON voltage pulse takes two thirds of the total cycle time may represent a second signal state.

Since a pulse-width modulated voltage is in each instance a voltage that changes over time, it is possible for such a pulse-width modulated signal to be easily transmitted via a transformer, while providing galvanic isolation. In a departure from the example above, it is, of course, possible to provide any duty factors desired, and especially to encode not just two, but more signal states in a pulse-width modulated voltage, for example, three different states when, for example, the duty factors are chosen to be one quarter, two quarters, or three quarters of the cycle time, or ultimately also any other duty factors and any number of different signal states.

The signals states are then transmitted by the pulse-width modulated voltage via the transformer through induction in the coils of the transformer, so that when a pulse-width modulated voltage is applied to the primary side of a transformer, a corresponding secondary voltage generated on the respective secondary side can be tapped therefrom and interpreted.

In this connection, a transformer can have any turns ratio between the primary and secondary coils, for example, a ratio of 1:1, or any other turns ratio, which will hereinafter be referred to as 1:n.

It is possible here to use not only a transformer having one secondary coil, but of course also to use a plurality of secondary coils, and thus ultimately to operate at different voltage levels on the secondary side when, for example, different or several identical turns ratios exist between the primary coil and the respective secondary coils, in which case it is also possible that a plurality of switching elements that are each connected to a separate secondary winding may be simultaneously driven by a common primary pulse-width modulated signal.

Ultimately, a pulse-width modulated voltage signal having the same duty factor as the primary pulse-width modulated voltage signal mentioned above is also generated on the secondary side.

The particular signal states transmitted can be further processed on the secondary side, for example, by providing a circuit which makes it possible to discriminate between the different duty factors and between the different voltage levels of the duty-factor dependent signal voltages, so as to thereby distinguish the corresponding signal states, allowing further processing of the information so obtained.

In accordance with a basic idea of the present invention, in principle, any means capable of detecting the different duty-factor dependent signal voltages is suitable to interpret the respectively transmitted signal states.

In addition to the transmission of signal states, one preferred embodiment of the method may provide for the voltage obtained on the secondary side to be also converted into a supply voltage which is independent of or only slightly dependent on the duty factor, for example, to provide a voltage supply for at least one electronic component provided on the secondary side.

Thus, it may preferably be possible to eliminate the need to provide a separate voltage supply for any electronic components that may be located in an electronic circuit on the secondary side of the transformer. Thus, the voltage applied to the primary side of the transformer and obtained on its secondary side can be used, on the one hand, to transmit a signal state and, on the other hand, to provide the voltage required for the operation of electronic components on the secondary side.

For this purpose, a supply voltage providing a sufficiently high voltage level with sufficient constancy to supply electronic components may be converted, or achieved in any other way, from the voltage obtained on the secondary side. What is important here is not necessarily that the supply voltage is absolutely constant. Rather, ultimately, voltage fluctuations, which often cannot be avoided in practice in connection with the different duty factors, are also permissible. Thus, ultimately, it is important that a generated supply voltage be, if not independent of, only slightly dependent on the duty factor of the voltage applied to the primary side.

The method of the present invention allows the different signal states to be discriminated from each other by the respective duty-factor dependent signal voltage that can be generated on the secondary side, since, for example, a signal voltage obtained at the first duty factor reaches a voltage level different from that reached by a signal voltage at a second duty factor. For instance, referring to the example above, a signal voltage obtained on the secondary side at a duty factor of one third can have a lower voltage level than a signal voltage obtained at a duty factor of two thirds. This allows the signal states to be discriminated by interpreting the respective voltage levels of the converted duty-factor dependent signal voltage.

One preferred embodiment of the present invention may provide that at least one reference voltage is generated by the circuit provided on the secondary side, and that thus an obtained signal voltage is compared to such a reference voltage. The result of such a comparison may represent a signal state. For example, a first signal state is interpreted to be present if the duty-factor dependent signal voltage is lower than the generated reference voltage; a second signal state being determined to be present if the result of the comparison is that the signal voltage is higher than the reference voltage.

It is considered advantageous for a reference voltage to be obtained, for example, from the supply voltage generated on the secondary side, or in a different way, or to be provided externally or internally, and especially in such a way that the reference voltage is just as independent of or only slightly dependent on the duty factor of the pulse-width modulated voltage supplied to the primary side as is the case for the supply voltage in accordance with the description above.

To allow further exploitation or any actions, especially of electronic nature, based on the signal states determined through comparison, a preferred embodiment of the present invention may provide for at least one switching means to be operated as a function of the result of a comparison. Thus, ultimately, a pulse-width modulated voltage applied to the primary side may cause one or more switching means to be operated in accordance with the respective signal states transmitted via the pulse-width modulated voltage. For instance, a switching means may be turned on or off depending on the duty factor, so that, for example, the ON and OFF states are associated with the respective different duty factors, or the operation of the switching means may be such that different switching means are associated with the different duty factors. This ultimately depends on the manner in which one skilled in the art performs the interpretation of the duty-factor dependent signal voltages or, in the example of the aforementioned comparison, on the manner in which one skilled in the art electronically interprets the result of such a comparison.

For example, in an advantageous embodiment of the method according to the present invention, a comparison between a signal voltage and a reference voltage may be performed by a comparator, to the inputs of which are applied the voltages to be compared, which means that, for example, the duty-factor dependent signal voltage is applied to a first voltage input, and the reference voltage, which is independent of or only slightly dependent on a duty factor, is applied to a second input of the comparator. The comparator, as an electronic component, may be supplied by the supply voltage, which is also independent of or only slightly dependent on the duty factor.

At the output of a comparator of the type provided here, an output voltage is then obtained which represents the signal state, because the output voltage is dependent on the result of the comparison between the particular voltages applied. In the aforementioned example, where the signal state is used to operate a switching means, the output voltage at the output of the comparator thus represents, in particular, a switching state, such as the ON or OFF state of a corresponding switching means provided in the circuit, which may be a transistor, such as a field-effect transistor, especially a MOSFET.

Here, it is generally possible to use switching means that switch as a function of the level of the output voltage of the comparator. To this end, for example, the gate of a field-effect transistor can be driven by the output voltage of the comparator. It is also possible to use other electronic components that operate as a function of the output voltage.

The steps of the method of the present invention can be easily implemented using a circuit including a transformer for galvanically isolating signals, it being possible for a pulse-width modulated voltage to be applied to the primary side of the transformer, as already described above. The secondary side of the transformer can then be connected to a circuit including at least the following:

a. a first series connection of two rectified diodes, the central potential of this first series connection of diodes being connected to one end of the secondary coil of the transformer;

b. a second series connection of two capacitors, the central potential of this second series connection being connected to the other end of the secondary coil of the transformer;

c. the first and second series connections being connected in parallel with each other (at the outer ends of the series connections, as shown in the figures); and d. a load being connected in parallel with the first and second series connections.

Because of these basic features of an inventive circuit for carrying out the method described above, the two aforementioned capacitors are charged with each voltage pulse transmitted by the transformer, due to the rectification by the aforementioned diodes.

The current flow in the two transformer windings is preferably prevented from any appreciable DC component by capacitors connected in series.

In this context, the current flow through the signal inputs of the comparators is generally negligible. In the steady-state condition, i.e., practically after a certain number of cycles of constant duty factor, the transformer windings will be nearly free of DC current. Since, therefore, the voltage across each transformer winding must also be nearly zero on average over a cycle of the pulse-width modulated signal (PWM signal), the square wave signal at the secondary winding of the transformer has positive components having a voltage U_high and a period T_high, as well as negative components having a voltage U_low and a period T_low. The convention here is that U_high>0 and U_low<0.

The absolute values of the negative and positive components change inversely with the duty factor of the PWM signal, but the sum of the two components is only slightly dependent on the duty factor, provided that the duty factor of the PWM signal is significantly different from 0% or 100%.

The following approximations can be made:

$$T\_high*U\_high+T\_low*U\_Low=0,$$

and for the absolute values, it holds approximately that:

$$|U\_high|+|U\_low|=n*U\_in$$

where n is the turns ratio of the transformer (secondary/primary), and U_in is the voltage range of the primary-side PWM signal, for example 5V.

From this it follows immediately that, at different duty factors of the pulse-width modulated voltage applied to the primary side, a duty-factor dependent voltage, or at least a dependent voltage profile, builds up on the secondary side across the respective capacitors; the voltage level of said voltage then being able to represent a signal state.

In an embodiment of the present invention, an element for suppressing DC components through the primary coil may be placed in series with the primary coil; it being, in particular, preferred for this element to be a capacitor. In order to achieve as clean a voltage as possible, and thus to achieve signal states that can be readily discriminated, further active or passive components which are capable of smoothing, buffering, filtering, or otherwise influencing the obtained voltage may also be placed both on the primary side and on the secondary side in the circuit that has already been described above and will be further described hereinafter. Such components make no direct contribution to the present invention and will not be further described hereinafter.

In an embodiment of the present invention, the aforementioned load may be formed at least partially by at least one resistive load, especially of a series connection of at least two ohmic resistors. Thus, in this case, the discharge behavior over time of the aforementioned capacitors may be controlled by the selected values of these ohmic resistors. It is also possible for the load to be formed at least partially by an electronic component, here, for example, by the comparator described above.

To allow a comparison to be made by a comparator as described above, an advantageous embodiment of the present invention may provide for a first input signal of a comparator to be derived from the central potential of the second series connection of the capacitors. The above-described duty-factor dependent voltage of the capacitors can be tapped from this central potential. Furthermore, the voltage at the series connection of the load-forming resistors may be tapped and used as a second input signal of a comparator. Here, for example, in the case of a series connection of two resistors, said voltage can be tapped between these two resistors, or, in the case of a series connection of a plurality of resistors, said voltage can also be tapped at any point between the resistors provided, depending on the desired voltage level of this reference voltage, since ultimately the series connection functions as a voltage divider chain.

In place of a series connection of two or more resistors, it is therefore also possible to use one or more center-tapped resistors which may, in particular, be potentiometers, and which can then be used to adjust the magnitude of the reference voltage.

Ultimately, through the implementation of a series connection of a plurality of ohmic resistors, or of a plurality of potentiometers, it is also possible to build a circuit in which a plurality of comparators are used, thereby allowing the duty-factor dependent voltages to be compared to a plurality of different reference voltages.

As was described earlier for the method, provision can be made for at least one capacitor to be connected in parallel with the series connection of the diodes; the capacitance of said capacitor being larger than the capacitance of each of the capacitors of the second series connection, i.e., of the capacitors across which the duty-factor dependent voltage can be tapped.

This capacitor connected in parallel with the series connection of the diodes may, for example, have a capacitance at least five times, preferably 40 to 60 times larger than the capacitance of the capacitors of the second series connection. This has the advantage that this capacitor is charged by the pulses generated on the secondary side and that, due to its high charge capacity, it basically provides a voltage which is independent of or only slightly dependent on the duty factor and which may be tapped from the capacitor, for example, to supply voltage to electronic components, such as the comparator.

Accordingly, therefore, the supply voltage of the comparator and/or the reference voltage for the second input signal of a comparator may be derived from the voltage that can be tapped across the aforementioned capacitor, possibly by tapping it from a voltage divider chain or from a potentiometer.

The comparator, as an electronic component, thus allows the duty-factor dependent voltage to be directly compared to the voltage that is independent of or only slightly dependent on the duty factor, thus making it possible to determine whether the signal voltage is higher or lower than the reference voltage. According to this comparison and the result of the comparison, a comparator element provides an output signal or an output voltage whose level then represents a signal state and therefore varies with a change in the duty factor present in each particular case. Thus, such an output signal or output voltage can be applied to the control input of a switching means to cause this switching means to switch. It is also possible to provide a plurality of switching means, which may be MOSFETs to the gates of which is applied the output signal of the comparator. This may then allow a MOSFET to be turned on or off.

An above-described circuit according to the present invention may further contain a component to provide an output signal that is inverted with respect to the output signal of a first comparator. In particular, this component may be an additional comparator whose inputs are driven inversely with respect to the first comparator. It is also possible, of course, to explicitly connect an inverter element to the output signal of a first comparator.

Due to the circuit design, especially due to the inductance and capacitance values, the frequency of the PWM signal, and the duty factors used in the above-described circuit and method, it is clear that, after switching from one duty factor to another duty factor, switching between different signal states, and thus, switching of a switching means provided, is performed only after the new duty factor has been present for a certain number of initial cycles, because it is only then that the signal voltage exceeds the threshold for operating the switching means.

In the above section, it has been pointed out that what is important for a comparison is mainly that the obtained signal voltage is highly dependent on the duty factor of the voltage applied to the primary side, and that the respective reference voltage generated is independent of or only slightly dependent on the duty factor. Ultimately, in any case, it is important that the ratio of the signal voltage at a long duty factor to the signal voltage at a short duty factor in the circuit varies to a much greater extent than the ratio of the reference voltage at a long duty factor to the reference voltage at a short duty factor.

Thus, it is always possible to ensure that the different duty factors and thus signal states in the circuit can be discriminated.

BRIEF DESCRIPTION OF THE DRAWINGS

Exemplary embodiments of the present invention are shown in the drawings.

FIG. 5 is a list of components which may be used for carrying out the method using the circuits.

DETAILED DESCRIPTION

Figure 1:
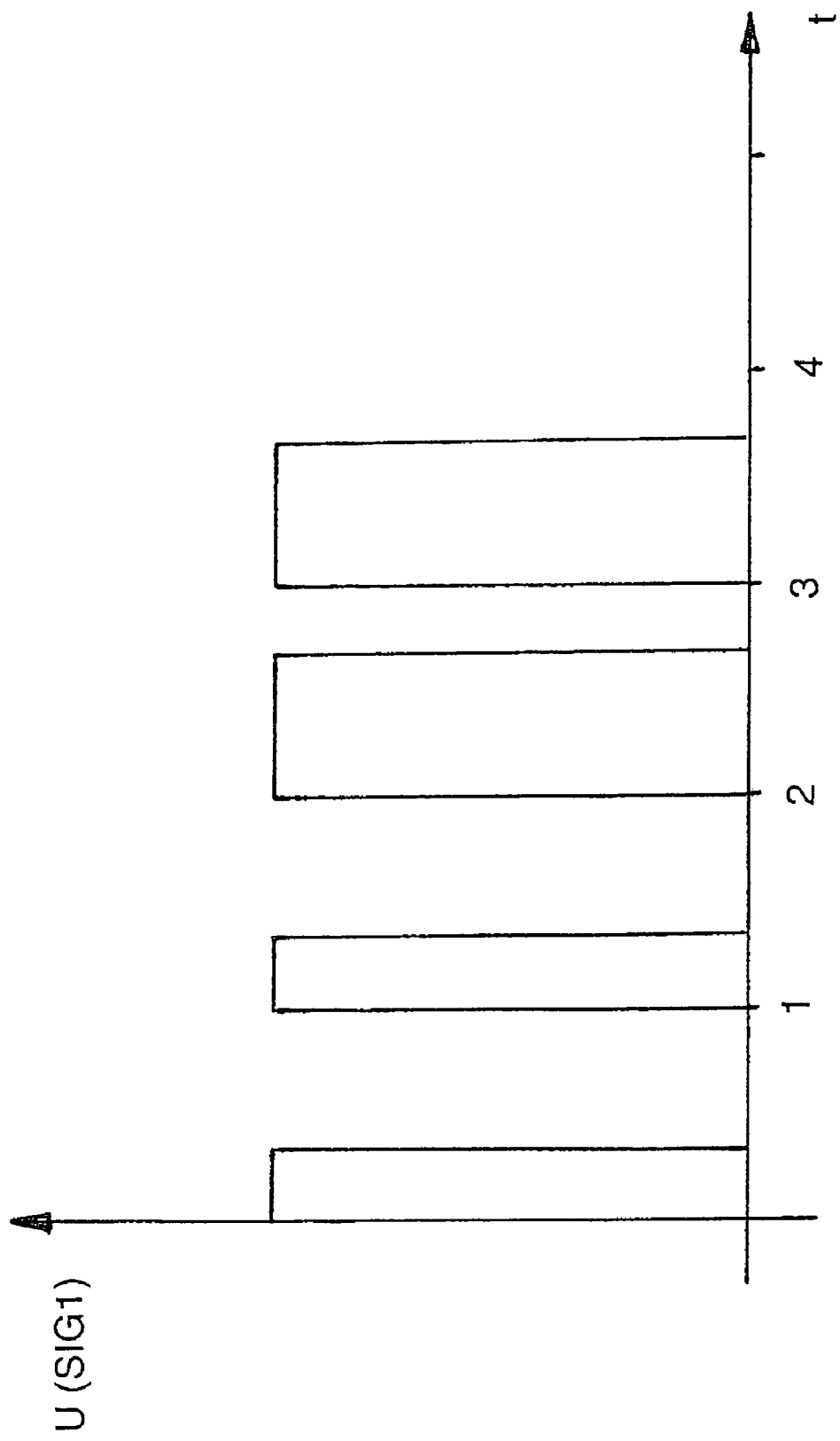
FIG. 1 is a plot of a primary voltage over time, firstly for a duty factor of one third and secondly for a duty factor of two thirds.

FIG. 1 illustrates the typical voltage profile on a primary side of a galvanically isolating transformer. It is obvious here that the first two pulses have a smaller duty factor than the rear two voltage pulses shown in the illustration. It is clear that the present invention may provide that the voltage level of each pulse is always the same and that only the time width of a pulse varies.

In the present illustration, the frequency of the recurring voltage pulses is always constant, which means that there is a constant cycle time, here with a unit of time; the first two voltage pulses shown in the illustration taking one third of the total cycle time and the rear two voltage pulses taking two thirds of the total cycle time. Accordingly, it can be seen here that the duty factor varies and that it changes at the end of the second cycle. Thus, in the span of the first two time cycles, the pulse-width modulated voltage signal represents a first signal state, while during the rear two cycles, it represents a second signal state.

Using the circuits shown in the following figures, these two signal states on the secondary side of the transformer can be discriminated from each other, and switching means can be controlled as a function of the duty factors.

Figure 2:
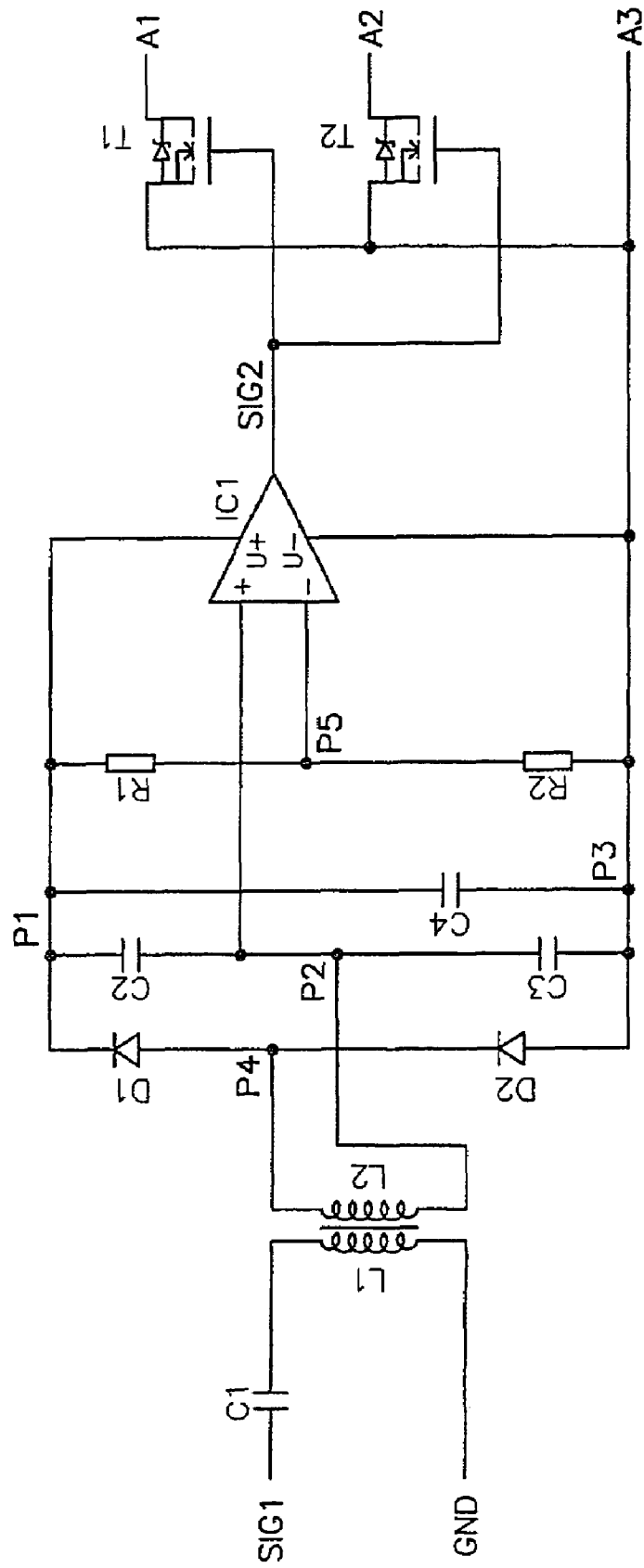
FIG. 2 shows a circuit arrangement for carrying out the method and for driving two MOSFETs.

FIG. 2 illustrates this for a first embodiment of the present invention. Viewing from left to right, it can be seen that, via a capacitor C1 for suppressing DC voltage, a primary coil L1 of a transformer is driven by a voltage signal, as shown in FIG. 1. Accordingly, a secondary voltage is generated in coil L2, possibly with a transformation ratio corresponding to the turns ratio of coils L1 and L2. It can be seen here that the central potential of a series connection of two rectified diodes D1 and D2 is connected at point P4 to one end of coil L2 and that the center potential of a series connection of the two capacitors C2 and C3 is connected to the other end of coil L2 via point P2.

The two series connections, i.e., the first series connection of diodes D1 and D2 and the second series connection of capacitors C2 and C3, are in parallel with each other. Also connected in parallel is a load, which, in the present example of FIG. 2, is formed at least by ohmic resistors R1 and R2 as well as by IC1; IC1 representing a comparator.

This load including the ohmic resistors and the comparator allows the respective capacitors C2 and C3 to discharge according to a specific time response, which is substantially determined by both the magnitude of the ohmic resistors and by the capacitance of capacitors C2 and C3. Capacitors C2 and C3 are sized so small that as short a discharge time as possible is obtained, so that the voltage at point P2 with respect to either point P3 or point P1 is strongly dependent on the selected duty factor of the primary input voltage.

If the capacitance of capacitor C4, which is in parallel with the series connection of diodes D1 and D2 and with capacitors C2 and C3, is large enough, here about 40 to 60 times larger than each of capacitors C2 and C3, then a voltage which is substantially independent of or only slightly dependent on the duty factor of the primary input voltage can be tapped across C4 at points P1 and P3. In the present configuration, a slight dependence can probably not be entirely avoided.

The voltage that can be tapped across points P1 and P3, i.e., across capacitor C4, is further used as a supply voltage for comparator IC1, so that the present invention may provide that all electronic components, here, for example, IC1, ultimately obtain a supply voltage from the primary input voltage.

It can be seen that the voltage applied to the lower input of comparator IC1 is the central potential between ohmic resistors R1 and R2, so that if resistors R1 and R2 are identical, the voltage applied is half the voltage that can be tapped across capacitor C4. This voltage may provide a reference voltage with which the signal voltage that can be tapped at point P2 may be compared.

In the example chosen here, resistors R1 and R2 can have the same ohmic resistance, as mentioned earlier, so that the voltage across C4 is ultimately reduced by half. However, it is also possible to choose other voltage divider ratios between R1 and R2. As mentioned also in the general description section, a center-tapped potentiometer or a single center-tapped fixed resistor can be used here as well.

Depending on the comparison and on the supply voltage of comparator IC1, a digital output signal SIG2 is obtained, which represents the result of the comparison. Accordingly, a high voltage (high level) can be present if, for example, the signal voltage at point P2 is higher than the reference voltage at point P5. Voltage SIG2 can be lower (low level) if the signal voltage at point P2 is lower than the reference voltage at point P5.

The output voltage SIG2 of the comparator can then be used to drive the gates of MOSFETs T1 and T2, resulting in a conductive connection between point A3 and the two points A1 and A2. In addition, the connection from A1 to A2 is enabled. Accordingly, in this circuit, transistors T1 and T2 represent switching means which can be used to enable or stop current flow between A3 and A1/A2 and between A1 and A2, respectively.

Thus, when considering the circuit according to FIG. 2, it is clear that transistors T1 and T2 can be enabled or disabled as a function of the duty factor of primary input voltage SIG1.

It should be pointed out here once again that, an important part of the inventive circuit described herein is, first of all, only the parallel connection of the first and second series connections, i.e., of diodes D1 and D2 on the one hand and of capacitors C2 and C3 on the other, with a further load, because this already allows a duty-factor dependent signal voltage to be generated across the respective capacitors C2 and C3, which enables those skilled in electrical engineering to discriminate between these two dependent signal voltages. The discrimination method described in the example where a comparator is used represents a possible exemplary embodiment, but it is conceivable to distinguish the voltage levels in other ways as well.

Figure 3:
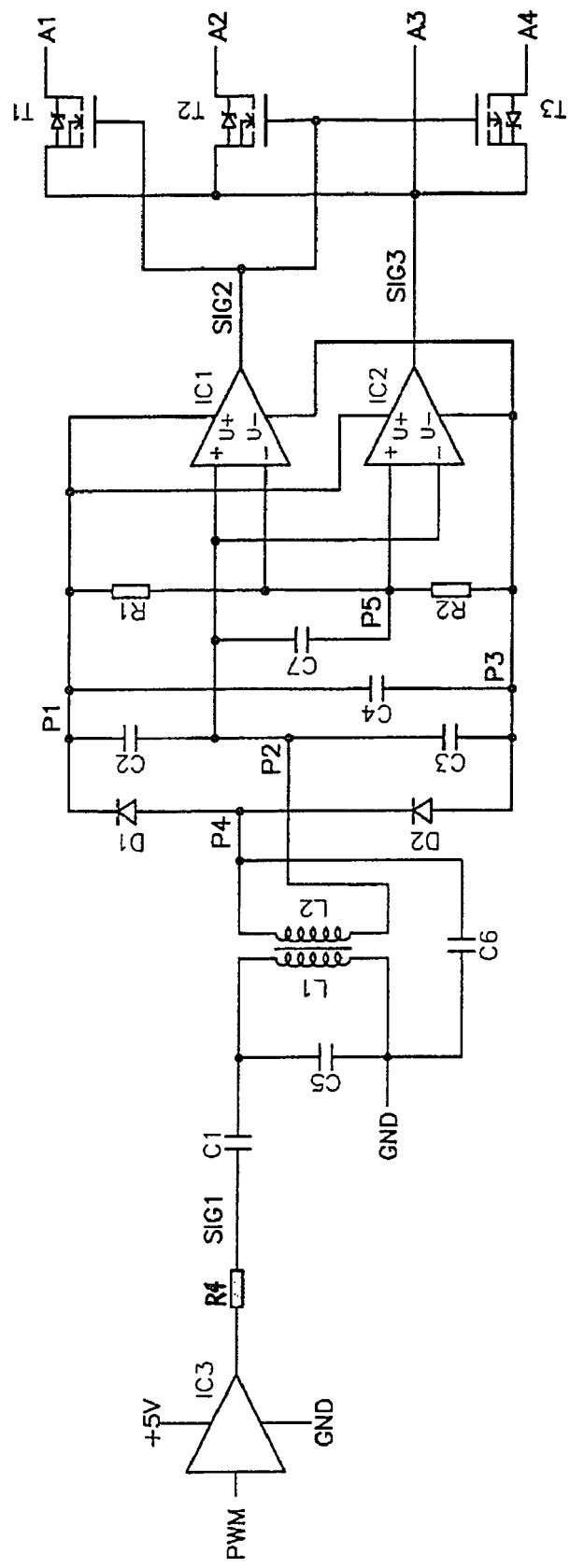
FIG. 3 shows a circuit containing comparators which operate inversely with respect to each other.

Compared to FIG. 2, FIG. 3 shows basically the same design, but includes additional elements, such as a power driver on the primary side and additional capacitors on the secondary side for smoothing and filtering the respective voltages. However, the main difference in the present case is that a second comparator IC2 is provided on the secondary side, the inputs of said second comparator being driven inversely with respect to the inputs of comparator IC1, so that output signals SIG2 and SIG3 are inverse to each other. Here too, the gates of the individual transistors T1, T2 and T3 are driven by output signal SIG2 of the first comparator.

Figure 4:
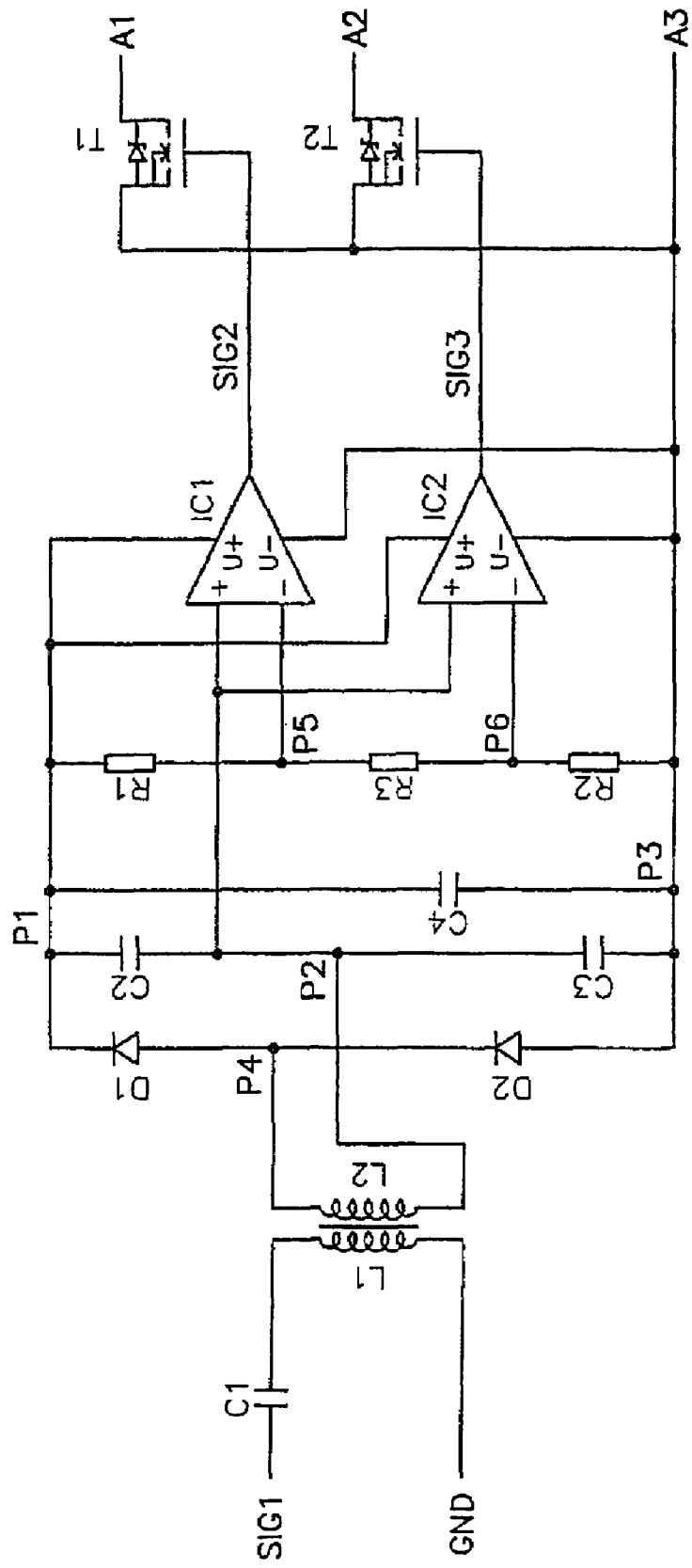
FIG. 4 shows a circuit containing two comparators which operate at different reference voltages.

The circuit shown in FIG. 4 is substantially similar to that of FIG. 2. In contrast to FIG. 2, however, a voltage divider chain of three ohmic resistors R1, R2 and R3 is provided here, and there exist two comparators IC1 and IC2. It can be seen here that the reference voltage of comparator IC1 is obtained at voltage tap P5 between resistors R1 and R3, and the reference voltage of comparator IC2 is obtained at voltage tap P6 between R2 and R3.

As a result of this, the two comparators operate at different reference voltage levels. This may make it possible, for example, to distinguish more than just two different duty factors, as in FIGS. 2 and 3. It should be mentioned only by way of example that duty factors of one quarter, two quarters, or three quarters of the total cycle time can be distinguished here for the ON pulse. Of course, other duty factors are possible here as well. Thus, depending on the level of the signal voltage at point P2 between capacitors C2 and C3, it is possible that only transistor T2 or transistor T1, or also both transistors, is/are enabled as a function of the two reference voltages to allow current to flow from A3 to A1 or A2.

FIG. 5 is a list of components which may be used for implementing the circuits.

It is clear from all the figures that a signal encoded in the duty factor of a pulse-width modulated voltage can be readily transmitted via a galvanically isolating transformer having coils L1 and L2, it being possible for switching means provided in a circuit to be controlled, and thus switched, by interpreting the duty factors, and the transformer simultaneously transmitting an operating voltage for operating the switching means. In accordance with the circuits shown, this is achieved using inexpensive electrical and electronic components of the simple kind, allowing the respective circuits to be built and implemented in a cost-effective manner using standard components.

What is claimed is:

1. A circuit comprising a transformer configured to galvanically isolate signals and to have a pulse-width modulated voltage applied to a primary side thereof, a secondary side of the transformer being connected to a second circuit comprising:
    a first series connection including a first and a second rectified diode, a first central potential of the first series connection being connected to a first end of a secondary coil of the transformer;
    a second series connection including a first and a second capacitor, a second central potential of the second series connection being connected to a second end of the secondary coil of the transformer, the second series connection being connected in parallel with the first series connection; and
    a load including a comparator connected in parallel with the first and second series connections, wherein a first input signal of the comparator is derived from the second central potential, the first input signal derived from the second central potential being dependent on the pulse-width modulated voltage.

2. The circuit as recited in claim 1 further comprising an element connected in series with a primary coil of the transformer, the element being configured to suppress DC components through the primary coil.

3. The circuit as recited in claim 2 wherein the element includes a third capacitor.

4. The circuit as recited in claim 1 wherein the load includes at least one resistive load.

5. The circuit as recited in claim 4 wherein the resistive load includes a series connection of at least two ohmic resistors.

6. The circuit as recited in claim 5 wherein the comparator is configured to have a second input signal thereof derived from a voltage tap at the series connection of the at least two ohmic resistors.

7. The circuit as recited in claim 1 further comprising at least one fourth capacitor connected in parallel with the first series connection, a capacitance of the fourth capacitor being larger than a respective capacitance of the first capacitor and of the second capacitor.

8. The circuit as recited in claim 7 wherein the capacitance of the fourth capacitor is at least 5 times larger than the respective capacitance of the first capacitor and of the second capacitor.

9. The circuit as recited in claim 8 wherein the capacitance of the fourth capacitor is 40 to 60 times larger than the respective capacitance of the first capacitor and of the second capacitor.

10. The circuit as recited in claim 7 wherein at least one of a supply voltage of the comparator and a reference voltage for a second input signal of the comparator is derived from a voltage across the at least one fourth capacitor.

11. The circuit as recited in claim 1 further comprising at least one switching device, and wherein the output signal of the comparator is applied to a control input of the at least one switching device.

12. The circuit as recited in claim 11 wherein the control input includes a gate of a field effect transistor.

13. The circuit as recited in claim 12 wherein the field-effect transistor is a MOSFET.

14. The circuit as recited in claim 1 wherein the load includes a component, a second output signal of the component being inverted relative to a first output signal of the comparator.

15. The circuit as recited in claim 14 wherein the component includes a second comparator having second inputs driven inversely relative to first inputs of the first comparator.

* * * * *